United States Patent
Brodkorb et al.

(10) Patent No.: US 7,856,631 B2
(45) Date of Patent: Dec. 21, 2010

(54) SOFTWARE DELIVERY MANAGER

(75) Inventors: Thomas Brodkorb, Wiesloch (DE);
Christian Gabrisch, Karlsruhe (DE);
Ralf Belger, Ludwigshafen (DE)

(73) Assignee: SAP Aktiengesellschaft, Walldorf (DE)

( * ) Notice: Subject to any disclaimer, the term of this patent is extended or adjusted under 35 U.S.C. 154(b) by 1479 days.

(21) Appl. No.: 10/142,725

(22) Filed: May 8, 2002

(65) Prior Publication Data

US 2003/0212990 A1  Nov. 13, 2003

(51) Int. Cl.
*G06F 9/445* (2006.01)
(52) U.S. Cl. .................. 717/177; 717/174; 717/175; 717/176; 717/178
(58) Field of Classification Search ......... 717/168–178; 709/220–223
See application file for complete search history.

(56) References Cited

U.S. PATENT DOCUMENTS

| | | | | |
|---|---|---|---|---|
| 5,155,847 A * | 10/1992 | Kirouac et al. | ............... | 717/170 |
| 5,715,462 A * | 2/1998 | Iwamoto et al. | ............. | 717/173 |
| 5,752,042 A * | 5/1998 | Cole et al. | ................... | 717/173 |
| 5,960,204 A * | 9/1999 | Yinger et al. | ................ | 717/176 |
| 5,999,740 A * | 12/1999 | Rowley | ....................... | 717/173 |
| 6,151,643 A * | 11/2000 | Cheng et al. | ................. | 710/36 |
| 6,202,207 B1 * | 3/2001 | Donohue | .................... | 717/173 |
| 6,289,512 B1 * | 9/2001 | Edwards et al. | ............. | 717/178 |
| 6,381,742 B2 * | 4/2002 | Forbes et al. | ................ | 717/176 |
| 6,725,453 B1 * | 4/2004 | Lucas et al. | ................. | 717/178 |
| 6,826,750 B1 * | 11/2004 | Curtis et al. | ................ | 717/170 |
| 6,880,086 B2 * | 4/2005 | Kidder et al. | ............... | 713/191 |
| 6,892,382 B1 * | 5/2005 | Hapner et al. | ............... | 717/174 |
| 6,986,135 B2 * | 1/2006 | Leathers et al. | ............ | 717/177 |
| 6,990,660 B2 * | 1/2006 | Moshir et al. | ............... | 717/171 |
| 7,260,819 B2 * | 8/2007 | Spotswood et al. | ......... | 717/177 |
| 2002/0178439 A1 * | 11/2002 | Rich et al. | ................... | 717/174 |
| 2003/0050932 A1 * | 3/2003 | Pace et al. | ...................... | 707/1 |
| 2003/0110253 A1 * | 6/2003 | Anuszczyk et al. | ......... | 709/224 |
| 2003/0158919 A1 * | 8/2003 | Fomenko | .................... | 709/220 |
| 2003/0192031 A1 * | 10/2003 | Srinivasan et al. | .......... | 717/120 |

FOREIGN PATENT DOCUMENTS

| | | | |
|---|---|---|---|
| EP | 1050813 | A2 | 11/2000 |
| WO | WO01/42909 | | 6/2001 |

OTHER PUBLICATIONS

Edward Bailey, "Maximum RPM Taking the Red Hat Package Manager to the Limit", 2000, Red Hat, Inc.*

(Continued)

*Primary Examiner*—Lewis A Bullock, Jr.
*Assistant Examiner*—Jue Wang
(74) *Attorney, Agent, or Firm*—Fish & Richardson P.C.

(57) ABSTRACT

Methods and apparatus, including computer program products, for receiving and processing a software delivery archive to deploy software to a target computer system, in particular to deploy software into a J2EE server. The software delivery archive can be implemented as a JAR-compatible archive that includes a supplementary manifest and a deployment descriptor, in addition to a standard JAR manifest and software to be deployed. The software delivery archive can optionally also include a nested software delivery archive have the same structure and functionality.

15 Claims, 3 Drawing Sheets

OTHER PUBLICATIONS

Mauro Marinilli, "Java Deployment with JNLP and Webstart", Sep. 2001, Sams, Chapters 5, 9, Chapter 11, section "Controlling Installations", Chapter 12.*

Sun, "Developer's Guide for Java Web Start", Aug. 2001, Web Start documentation from Sun. Rretrieved from: http://web.archive.org/web/20010801172741/http://java.sun.com/products/javawebstart/docs/developersguide.html.*

Sun, "Packaging JNLP Applications in a Web Archive", Aug. 2001, Web Start documentation from Sun. Retrieved from: http://web.archive.org/web/20010802214630/java.sun.com/products/javawebstart/docs/downloadservletguide.html.*

Steven Kim, "Java Web Start", Sep. 2001, IBM Developer Works. Retrieved from: http://www.ibm.com/developerworks/java/library/j-webstart/.*

\* cited by examiner

SOFTWARE DELIVERY MANAGER

FIELD OF THE INVENTION

The present invention relates to the deployment of software and software components.

BACKGROUND OF THE INVENTION

A goal of information technology (IT) is to support business processes. Business processes may include a set of web services, which are provided by applications running on different components from multiple vendors.

Applications within an IT landscape can include test systems, quality assurance systems, and production systems. Each such system provides one or more computer program applications ("application programs" or simply "applications") running on a computer platform based on computer hardware and peripherals, on which are generally built several layers of software to support the execution and use of application programs. One example of such a platform is a web application server that provides a J2EE (Java 2 Platform, Enterprise Edition) platform for Java programming language applications.

Application requirements within the IT landscape change over time as companies institute business or organizational changes, as they implement addition functions. For this and other reasons, vendors of application programs generally generate and provide to their customers patches, updates, and upgrades to correct errors, to satisfy new technical requirements, and to satisfy new business requirements. Customers may also generate patches and updates, as well as customer-specific extensions to vendor-supplied applications. Sometimes an update or upgrade involves changes in customer configuration settings for particular applications or the migration of particular software (i.e., computer program) components to newer software releases. In addition, as IT landscapes change, intersystem and inter-application dependencies must be managed. A change in one component, for example, may require adaptations in another component.

Patches, updates, and upgrades must generally be deployed. In simple systems, deployment may involve no more than copying an updated component, for example, to a directory in a file system. Generally, however, deployment involves many steps of selecting, configuring, removing, and installing multiple components to achieve a desired application and system state. In enterprise and mission critical contexts, a customer will generally deploy and test new application and system elements on a test system or a quality assurance system, or both, before the deployment is performed on a production system, that is, on a system that is used as a live data processing production environment.

The technical effect of a deployment of software into a computer system is to change the functional or operational characteristics of the system, or both, or of one or more applications or other services running on the system or in conjunction with the system.

SUMMARY OF THE INVENTION

The invention provides software deployment tools and methods and data structures performed by or used in conjunction with such tools. An implementation of a tool in accordance with the invention will be described. It is called the Software Delivery Manager (SDM).

In general, in one aspect, the invention features a software deployment tool that uses an abstract, extensible notion of software server types. Instances of these software server types are used as targets systems for software delivery and may form alone or combined a production runtime environment. Examples are J2EE-servers, database instances or file systems.

In general, in another aspect, the invention features a software deployment tool that uses an abstract, extensible notion of software types. All software deliveries are typed and, through a type mapping, target systems within a local deployment environment are found.

In general, in another aspect, the invention features a software deployment tool that uses a uniform delivery archive format for all software types. In the SDM implementation, the format is ZIP- and JAR-compatible and self-contained. It includes the software to be delivered and additional versioning-, dependency- and deployment-information. What additional information is included can be dependent on the specific software type.

In general, in another aspect, the invention features a delivery archive carrying deployment information that can be used to transport knowledge from a development to a production system, or from a software producer to software consumer. This can ease the manual tasks involved during deployment of software or even allows for full automation of the deployment process. In the case of updates of already deployed archives, the deployment tool allows the reuse of the deployment parameters of a previous version.

In general, in another aspect, the invention features a delivery archive that, through the formulation and delivery of dependencies, can cause a software deployment tool to require specific versions of other software packages to be present within a production runtime environment. The deployment tool resolves the dependency information during deployment preparation and ensures that all dependencies are met or that the needed packages are deployed together.

In general, in another aspect, the invention features a software deployment tool that uses fingerprints on all delivered files within a delivery archive to check for modifications of previous versions. It supports the detection of collisions and the deployment of modified archives.

In general, in another aspect, the invention features a software deployment tool that provides the bundling of archives into larger units, which will be called catalogs. Because both catalogs and archives are provided, a software producer can create and deliver large logical units of software and at the same time retain the ability to deliver patches on a small, archive level.

In another aspect, the invention features a graphical user interface (GUI) and a programming interface (API), by which the functionality of the software deployment tool can be used at a customer site. Thus, configuration of target systems, configuration of deployments, processing software deployments and updates, and so on, may be done by a human deployer using the graphical user interface, or—in bigger installation scenarios—by an installation tool using the deployment tool through this API.

The GUI can include a navigation tree window, a deployment parameters window, a legend window, an information window, and a repository preview. The navigation tree window can include a hierarchical display of catalogs and archives that a user may select for deployment. The deployment parameters window can include a display of parameter groups necessary for deployment of an archive. The legend window can include a display of a description of icons used in a deployment process. The information window can include a display of information for archives or catalogs or both that are selected from the navigation tree window. The repository window can include a preview of a deployment repository after deployment.

The invention can be implemented to realize one or more of the following advantages. The software deployment tool can deploy software updates on a system in conjunction with a system's current configuration so that dependencies are managed. The tool can match a current system configuration with an updated configuration, and identify conflicts between the current configuration and the update. The tool can handle software changes, including file update deployment, database schema deployment and other update package deployment. The tool can be implemented using factories and interfaces for the handling of software types and software server types, and so have an architecture that is extensible by new software types and software server types. Delivery archives contain software changes and additional information for a specific target system type. Archives can be implemented to extend the deployable archive types from the J2EE specification (.ear, .war, .rar) in a fully J2EE compliant way. The additional information that extends the archive types is embedded within such archives using manifest files and an additional deployment descriptor. Thus, such an archive satisfies the Java standard and extends it.

DETAILED DESCRIPTION

Figure 1:
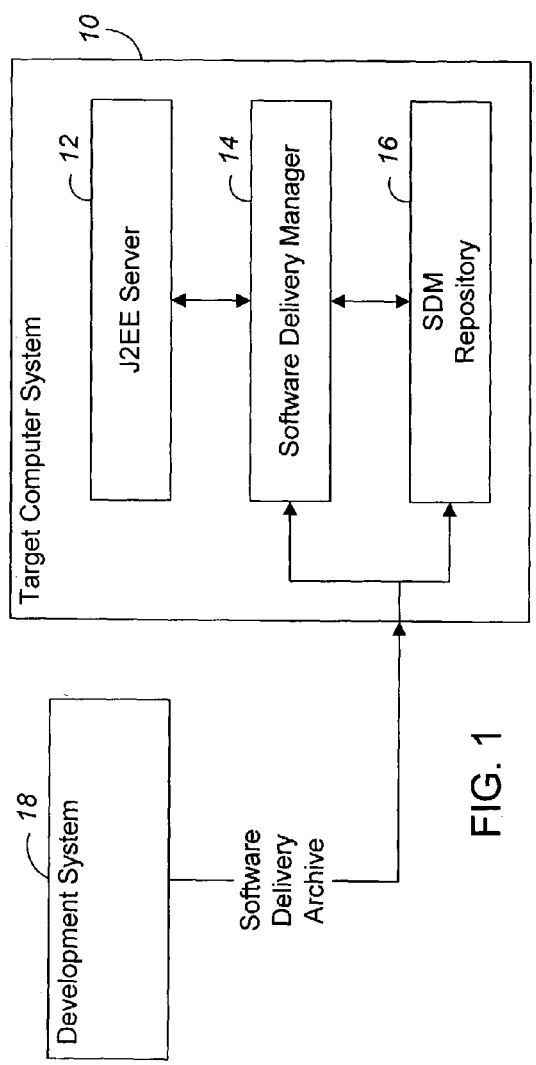
FIG. 1 is a block diagram of a system.

As shown in FIG. 1, a target computer system 10 includes a J2EE server 12 and can run Software Delivery Manager (SDM) 14, an implementation of a deployment tool made in accordance with the invention. The computer system 10 can be a test system, a quality assurance system, a production system, or a combination of them, or any other kind of data processing system on which software is deployed.

SDM uses a repository 16. SDM manages and deploys software delivery archives (SDAs)—the smallest units of software modification—that are received for deployment into the system 10. SDAs might be received, for example, from a development system 18, on any suitable carrier. The SDAs can be delivered in a software delivery catalog. A catalog contains meta-data descriptions of its SDAs, which the catalog bundles as logical deployment units.

Figure 2:
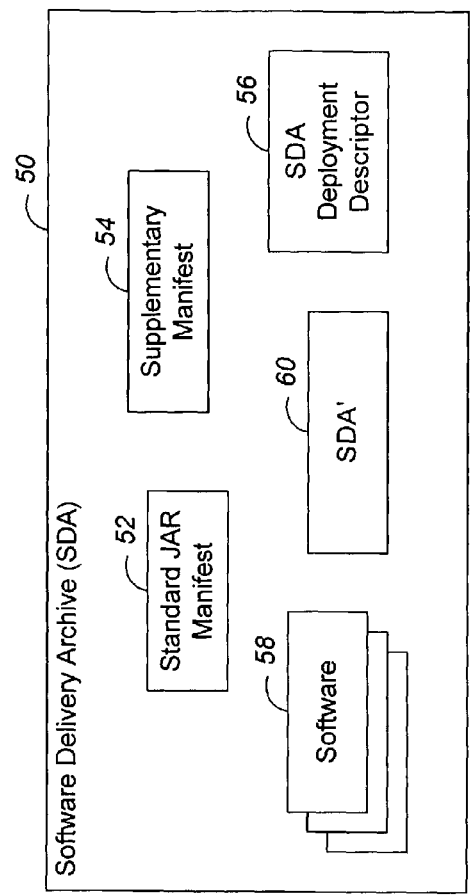
FIG. 2 is a block diagram of a software data archive data structure.

Illustrated in FIG. 2, a software delivery archive (SDA) 50 is a data structure having a delivery format for software applications and software elements. The SDA 50 is a ZIP and JAR-compatible archive format that can be used as a container for other archives. JAR (Java Archive) is a platform-independent file format used for aggregating many files into one. For example, multiple Java applets along with their requisite components (e.g., class files, images, property files) can be bundled in a JAR file.

The SDA 50 contains a standard JAR manifest 52 and a supplementary manifest 54, which contains additional context information, such as dependency information. The SDA also contains an SDA deployment descriptor 56, with software type specific deployment configuration data, and one or more software files 58 for deployment.

An SDA that does not contain any other archives is an atomic SDA. This is also the smallest unit for deployment and patch delivery. However, SDAs can be nested, with the manifest information being passed on to the SDA at the highest level. SDA 50 is illustrated as including one nested software delivery archive, SDA' 60. SDAs can be combined to a logical unit using a software delivery catalog, which is a special kind of SDA that contains only references to other SDAs.

A human deployer will generally be responsible for configuring and deploying software packages on the system 10 (FIG. 1). A deployer typically configures the software to be deployed, causes the configured software to be installed on the system in the appropriate places, and may start the software running. The additional deployment descriptor 56 of the SDA addresses the problem that deployment into J2EE can require a lot of interaction between the deployer and the J2EE engine. Rather than repeating this interaction during each deployment, the SDA 50 carries information from software development in the SDA deployment descriptor 56 that facilitates the deployment process. This is a transfer of application knowledge and developer expertise to the customer site, allowing a deployer without deep application knowledge to achieve successful and rapid deployment.

Figure 5:
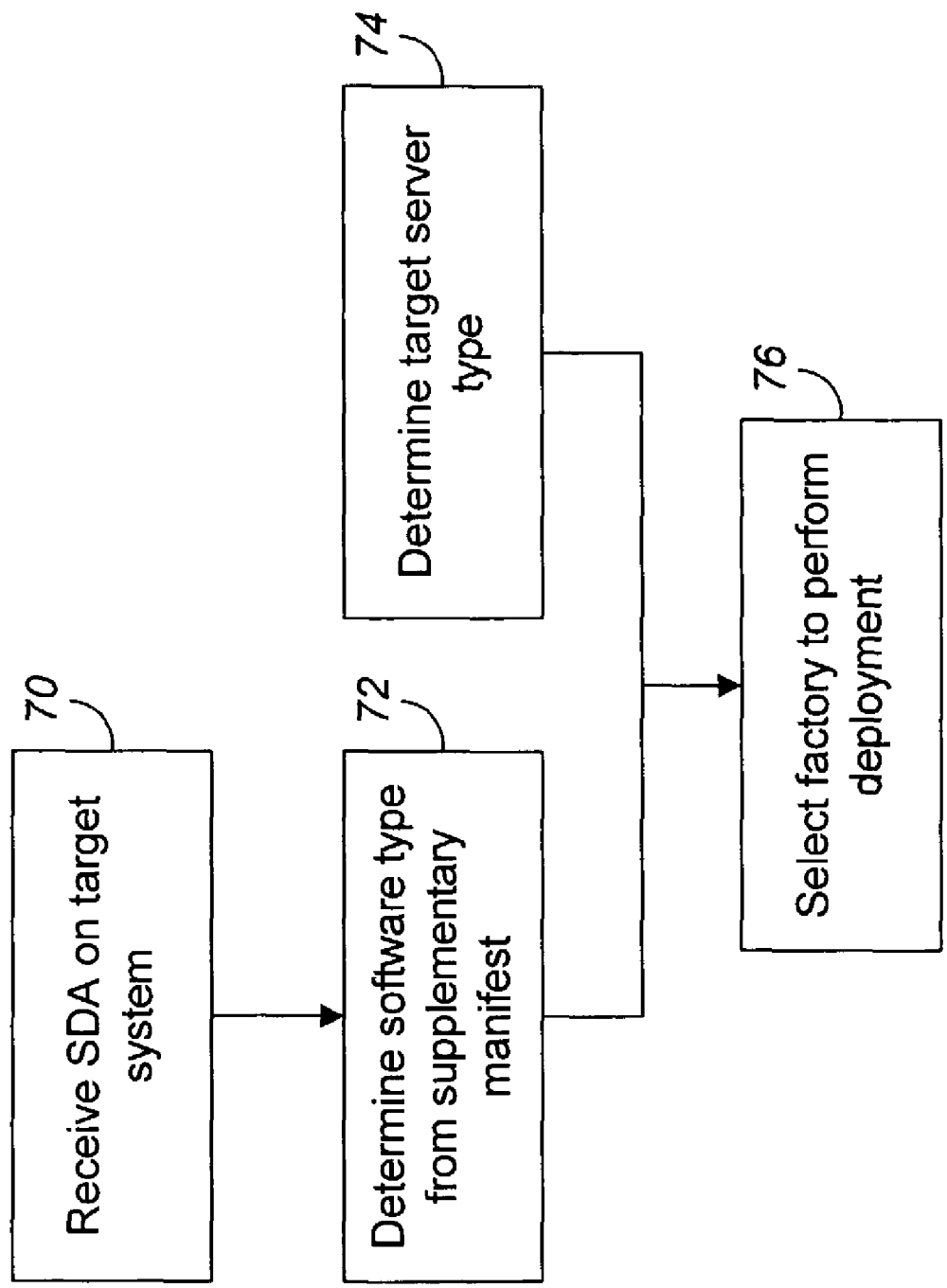
FIG. 5 is a flow diagram of a process for selecting a deployment engine.

SDM 14 triggers the deployment of the SDAs at the customer site. Depending on the software type of the SDA to be deployed and on the target system's server type, SDM 14 uses a specific engine to carry out the deployment. These engines (or factories) are implemented for each software server type SDM 14 supports. As illustrated in FIG. 5, SDM receives (70) an SDA, determines (72) its software type, determines the target server type (74), and selects (76) a factory or engine to perform the deployment. Servers are generally typed in the repository 16 when they are added. This can be done either manually or through an API function of SDM 14. The server type for deployment is identified through the element SoftwareType in the deployment descriptor.

For example, for deployment to a J2EE application server, the corresponding engine interacts with the J2EE Deployment API of the server to carry out the deployment. In another example, for the delivery of database content, the corresponding engine connects with a specific target database instance, and creates and executes SQL statements to update the data in this instance. Other examples are factories for file system deployment and for deployment of database structure definitions into a database instance. These examples show how diverse the deployment can be in individual cases and that SDM 14 is not restricted to only certain forms of deployment.

SDM 14 implements a general framework for the deployment of software, a framework that can include all deployment procedures for multiple server types. One or more Java interfaces are provided by SDM 14, which describe the API for the deployment of particular software types on corresponding server types. The server type factories and classes implement these interfaces. Example server types implemented for SDM 14 include deployment of J2EE applications on a J2EE engine; transfer of standalone Java developments (jars) to a JRE (Java Runtime Environment); and delivery of database contents. Having a general framework, one has the option of creating more implementations of these interfaces for additional server types.

SDM 14 also provides a programming API that can be used by using SDM 14 to define target systems, prepare deployment for SDAs, submit specific parameter values, and carry out deployments.

When deploying SDAs, SDM 14 stores data in a repository 16. The repository 16 includes a list of software delivery catalogs, SDAs, and products installed on the target system 10. The repository 16 also includes information about SDA dependencies, platform information, and fingerprints of every file used in applications running on the target system 10. SDM 14, in conjunction with the repository 16, recognizes dependencies between archives and provides support when shared applications are installed and maintained. SDM 14 supports resolution of intersystem dependencies, automatically extracting dependency information from the archives to be installed and comparing them against actual system states.

SDM 14 provides a browser-like GUI for local software administration that enables browsing, installation and patch application, for deployment of software updates to any target system.

The repository 16 contains information about all known logical target systems. All software deliveries are typed and, through a type mapping, target systems within a local deployment environment are found. SDAs are prepared for deployment into all logical targets that fulfill the dependencies the SDA requests. The deployer can deselect targets manually.

Figure 3:
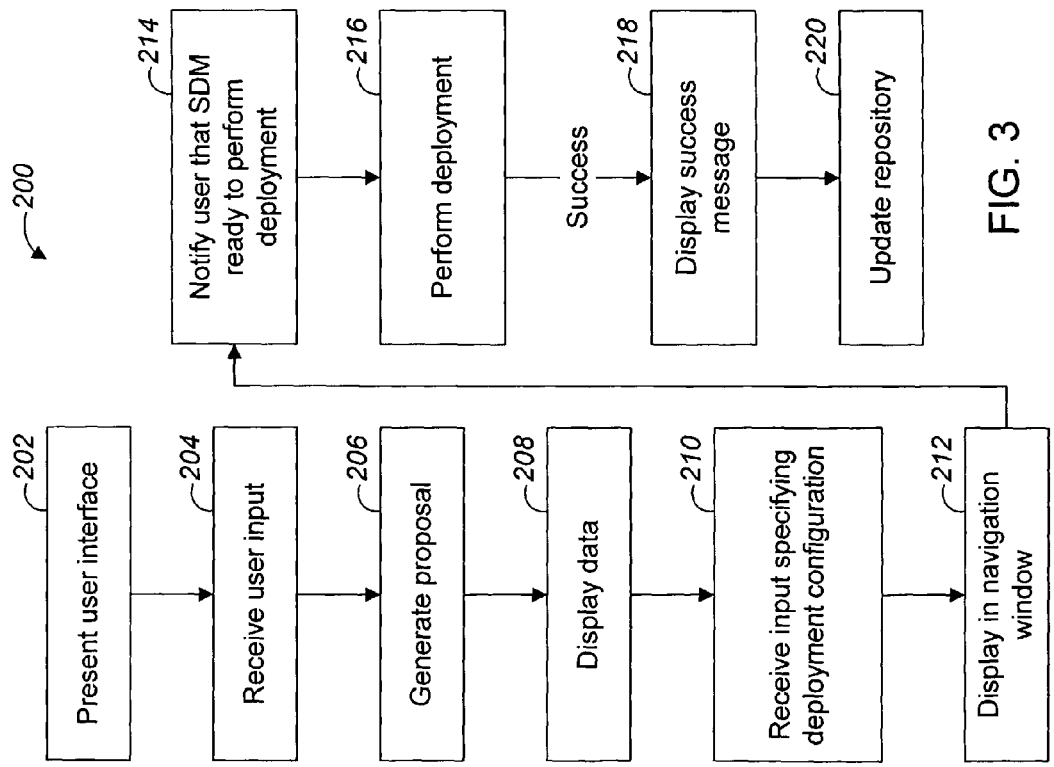
FIG. 3 is a flow diagram of a delivery process.

As shown in FIG. 3, an illustrative deployment process 200 includes presenting (202) an SDM user interface, which can be a graphical user interface (GUI), to the user deployer. The process 200 receives (204) user input for adding or deleting SWCs or SDAs to or from a deployment list.

The process 200, using SDM 14, generates (206) one or more deployment proposals from a manifest and SDA deployment descriptor data and displays (208) this information in an information window. The process 200 receives (210) user input specifying a deployment configuration. The deployment configuration is optionally displayed (212) in a navigation tree window. The process 200 notifies (214) the user that SDM 14 is ready to perform deployment. Upon the user's direction, SDM performs (216) the deployment. The process 200 displays (218) a success message on the user interface upon successful completion of deployment and updates (220) the repository 16 upon completion of the deployment.

In the case of updates of already deployed archives, SDM allows the reuse of the deployment parameters of a previous archive version. For example, in the J2EE case, if there are no changes in the deployment parameters between two versions of an SDA, SDM deploys the newer version without any human interaction by extracting the parameters from the J2EE target server and using them for the second deployment.

More specific information about the SDA and its contents will now be provided. SDA archives can be packed using a variety of tools like WinZip or jar.

Figure 4:
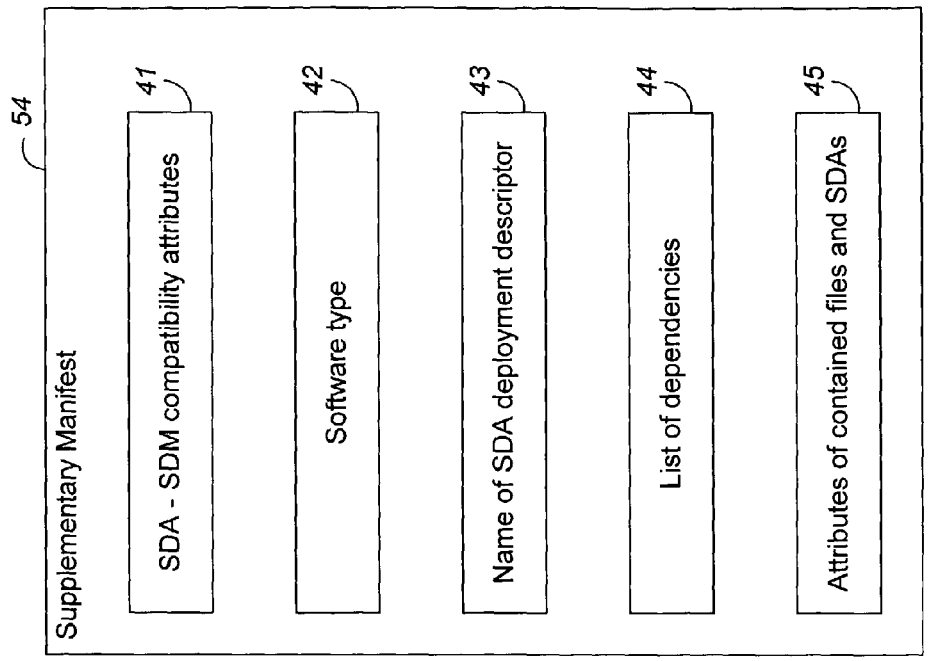
FIG. 4 is a block diagram of a supplementary manifest.

The following attributes describing the component of the software contained in an SDA are contained in the standard manifest of the SDA:
    Specification—Title
    Specification—Version
    Specification—Vendor
    Implementation—Title
    Implementation—Version
    Implementation—Vendor
    Implementation—Vendor-Id As illustrated in FIG. 4, the following attributes are contained in the supplementary manifest 54 of an SDA:

1. Attributes 41 describing compatibility of the SDA with different SDM versions:
    Manifest—Version
    SDM—Compatibility—Version
2. Software type 42 of the software contained in the SDA:
    softwaretype
3. Name 43 of the SDA deployment descriptor contained in the SDA:
    deployfile
4. List of dependencies 44 on other SDAs:
    dependencies
5. Attributes 45 for each file contained in the SDA and in recursively contained SDAs:
    Name
    _md5fingerprint The following table shows a simple, illustrative SDA deployment descriptor.

```
<?xml version="1.0" encoding="UTF-8" ?>
<SDA name="ShoppingCalculator.ear">
    <SoftwareType>J2EE</SoftwareType>
    <j2ee-deployiment-descriptor version="0.01">
        <display-name>Der ultimative Shopping-Calculator</display-name>
    </j2ee-deployment-descriptor>
</SDA>
```

The deployment descriptor is XML file that is included in every SDA. It contains information about the deployment, such as the software type and deployment configuration data.

The following table shows a simple, illustrative supplementary manifest for an SDA. The SDM compatibility version (SDM—Comp—Version) is provided to ensure that an SDA is handled only by an SDM that knows how to handle it.

```
Manifest-Version: 1.0
SDM-Comp-Version: 2
softwaretype: J2EE
JarSDM-Version: 20020418.1705
JarSDMProcessing-Version: 20020418.1705
changelistnumber: 4321
perforceserver: 0000
deployfile: sda-shopper-dd.xml
dependencies: <dependency dependencyType="global"
    Specification-Title="Calculator Utility Library"
    Specification-Version="1.0"
    Implementation-Title="com.SDM.sdmtest.calcutil" />
JarSL-Version: 20020415.1405
compress: true
Name: ShoppingCalculator.war/
Manifest-Version: 1.0
Name: ShoppingCalculator.war
_md5fingerprint: ef4438f428deca7d4d926ec4falfa08a
Name: META-INF/application.xml
_md5fingerprint: 38e28a5031c84142e7da9d98b6053375
Name: META-INF/sda-shopper-dd.xml
_md5fingerprint: 7ed47c033730d337c810783dc95476d4
```

The following table shows a self-documenting DTD (Document Type Definition) for an SDA deployment descriptor.

```
compress: true

Name: ShoppingCalculator.war/
Manifest-Version: 1.0

Name: ShoppingCalculator.war
_md5fingerprint: ef4438f428deca7d4d926ec4fa1fa08a

Name: META-INF/application.xml
_md5fingerprint: 38e28a5031c84142e7da9d98b6053375

Name: META-INF/sda-shopper-dd.xml
_md5fingerprint: 7ed47c033730d337c810783dc95476d4
```

The following table shows a self-documenting DTD (Document Type Definition) for an SDA deployment descriptor.

```
<!--
This is the DTD of the SDA deployment descriptor, which is
contained in the META-INF directory of each deployable SDA.

It contains the information specifying how an SDA has to be deployed on
a target system.

The way the deployment of an SDA works depends heavily on the
type of software which is contained in the SDA. Nevertheless there is
some information necessary for each type of software.

For this reason the DTD contains a generic part, which is needed for
each SDA, and several optional software type specific parts.
-->

<!--
Begin of generic part
-->
```

```
<!--
The root element of the SDA deployment descriptor.
-->
<!ELEMENT SDA (SoftwareType,
    (j2ee-deployment-descriptor | fs-deployment-descriptor)? )>
<!--
The element SoftwareType specifies the software type of the SDA's
content.
SDAs of the same software type are deployed in a similar way.
The currently SDM-built-in SoftwareTypes are:
    DBSC     Database content
    FS       set of files, which will be copied to an appropriate
             position in the file system
    J2EE     J2EE applications (Servlet, JSP, EJB, ...)
    JAVA-LIB Java libraries shared by several applications The element SoftwareType must be specified in every SDA deployment
descriptor.
-->
<!ELEMENT SoftwareType (#PCDATA)>

<!--
Begin of the specific parts of the different software types.

A software type specific part is required for the software types J2EE
(introduced by the element j2ee-deployment-descriptor) and FS
(introduced by the element fs-deployment-descriptor).

The software types DBSC and JAVA-LIB currently do not require a
software type specific part in the SDA deployment descriptor.
-->

<!--
Begin of the J2EE specific part of the SDA deployment descriptor.

The general purpose of the J2EE specific part of the SDA deployment
descriptor is to enable an as-easy-as-possible deployment process for
J2EE applications. Above all, easiness means automation here.
```

The standard J2EE deployment descriptors (that is, the deployment descriptors defined for J2EE applications and modules within the J2EE specification) generally do not contain sufficient information that is required for a completely non-interactive and automated deployment process. Therefore, the SDA deployment descriptor can be understood as a supplement to the standard J2EE deployment descriptor for this purpose.

In fact, the J2EE specific part of the SDA deployment descriptor enhances the definition of existing deployment parameters and introduces new deployment parameters that are not or not sufficiently covered by the standard J2EE deployment descriptors with regard to the above requirements.

Each deployment parameter the J2EE specific part of the SDA deployment descriptor consists of can be assigned one of the following three types:

1st type:
=============
There are deployment parameters that in principal can be assigned a pre-defined value within the standard J2EE deployment descriptors, but their semantics does not allow this, and simultaneously need to be supplied at deployment time. An example could be the location of some property file that the application requires, provided using an environment entry.

Deployment parameters of this kind have to be taken over from the standard J2EE deployment descriptors. The deployer will have to supply a value for each of these parameters that SDM finds in the SDA deployment descriptor. Note that each such deployment parameter leads to additional workload for the deployer and means a step away from an easy deployment process. Therefore, deployment parameters of this kind should be added to the SDA deployment descriptor with caution only. In particular, deployment parameters that can exclusively be supplied using application specific knowledge should be avoided in the SDA deployment descriptor.

The following deployment parameters are of this type:
* environment entries,
* context parameters,
* resource references.

2nd type:
=============

There are deployment parameters that cannot be assigned a pre-defined value at all within the J2EE deployment descriptors, since their values are completely determined by the operational environment the application is to be deployed to.

This type mainly consists of security roles.

3rd type:
=============

There are deployment parameters that are not covered by the J2EE deployment descriptors at all, possibly because they are vendor specific or result from assumptions on the application that are not made within the J2EE specification. Nevertheless, this kind of parameter should be pre-defined for an easy deployment procedure, if possible.

The following deployment parameters are of this type:
* database pools for EJB (Enterprise JavaBeans) entity beans,
* storage properties of container-managed entity EJBs (According to the J2EE specification, it is part of the deployer's role to map the fields of a container-managed persistence (CMP) entity bean to the persistency layer of the operational environment. There is no need for the developer to decide whether the persistency layer consists of a relational database, of an object-relation database or even of files in the file system. This strategy somehow contradicts the aim of an easy and automated deployment process, which is why the SDA deployment descriptor refers this task from the deployer to the developer.)

The syntax of the first and second types of deployment parameters has been derived largely from the DTDs of the J2EE deployment descriptors application.xml (J2EE spec. version 1.2),
web.xml (Servlet spec. version 2.2),
ejb-jar.xml (EJB spec. version 1.1) and
application-client.xml (J2EE spec. version 1.2).

Further, the structure of the J2EE specific part of the SDA deployment descriptor is similar to that of the J2EE deployment descriptors. Therefore, some familiarity with the J2EE deployment descriptors and with the concepts of J2EE in general is strongly recommended when creating an SDA deployment descriptor.

```
-->

<!--
The j2ee-deployment-descriptor element introduces the J2EE specific
part of an SDA deployment descriptor.

At least the display-name element has to be provided. Enter here the
name of the J2EE application as provided in the corresponding element
of the J2EE application deployment descriptor. A description of the
J2EE application should also be provided, if possible.

For each module that is contained in the J2EE application AND that
contains at least a single deployment parameter of one of the three
types defined above, a module element has to be provided here. J2EE
modules that do not contain any such deployment parameters must not be
taken over from the J2EE application deployment descriptor. Therefore,
it is possible to have no module element in an SDA deployment
descriptor, whereas in the J2EE application deployment descriptor there
needs to be at least a single module element.

Each security role defined in the standard J2EE deployment descriptors
has to be represented here by a security-role element.
-->
<!ELEMENT j2ee-deployment-descriptor (display-name, description?,
module*, security-role*)>
<!--
```

The version attribute enables the parser/interpreter of an SDA deployment descriptor to distinguish between different versions of this DTD.
-->
<!ATTLIST j2ee-deployment-descriptor
    version CDATA #FIXED "1.0"
>

<!--
The display-name element contains a short name for the parent element that is intended to be displayed by SDM.

Each occurrence of this element within the J2EE specific part of this DTD is accompanied by an occurrence of a corresponding display-name element in the DTD of the standard J2EE deployment descriptors.

Therefore, within the J2EE specific part of a concrete SDA deployment descriptor, the contents of the display-name elements have to coincide with the contents of their corresponding elements in the standard J2EE deployment descriptors.
-->
<!ELEMENT display-name (#PCDATA)>

<!--
The description element is used to provide text describing the parent element. This text should include any information that will be useful for the deployer. It is intended to be displayed by SDM.

Each occurrence of this element within the J2EE specific part of this DTD is accompanied by an occurrence of a corresponding description element in the DTD of the standard J2EE deployment descriptors.

Therefore, within the J2EE specific part of a concrete SDA deployment descriptor, the contents of the description elements have to coincide with the contents of their corresponding elements in the standard J2EE deployment descriptors.
-->
<!ELEMENT description (#PCDATA)>

```
<!--
Each security-role element in the SDA deployment descriptor corresponds
to a security-role element in one of the standard J2EE deployment
descriptors. The definition of the security role is repeated in the SDA
deployment descriptor. It consists of an optional description of the
security role, and the security role name.

SDM will display the security role to the deployer at deployment time.
The deployer then has to assign users and/or user groups of the
operational environment to the security role.

Alternatively, there is the option of pre-defining a role-user-mapping
using the mapped-users element. When such an element exists, SDM
automatically assigns the listed users and user groups to the security
role at deployment time. The security role will not be displayed to the
deployer then. The creator of a concrete SDA deployment descriptor has
to make sure that the users and user groups listed in this mapping
actually exist in any operational environment the SDA may be deployed
to. In particular, SDM does not create any such users or user groups at
deployment time in an operational environment.
-->
<!ELEMENT security-role (description?, role-name, mapped-users?)>
<!ELEMENT role-name (#PCDATA)>
<!ELEMENT mapped-users (user*)>
<!ELEMENT user (#PCDATA)>
<!ATTLIST user
          is-group (true | false) #REQUIRED>

<!--
The module element represents a single J2EE module. It contains an ejb-
jar, application-client or web-app element, which indicates the module
type, and contains a URI to the module file. It is intended to group
the deployment parameters by the J2EE modules contained in the J2EE
application.
```

In contrast to the standard J2EE deployment descriptors, the J2EE specific part of the SDA deployment descriptor must have a module element exclusively for those J2EE modules containing at least a single deployment parameter of one of the three types defined above. In other words, a J2EE module that does not contain any such deployment parameter must not be represented by a module element in the SDA deployment descriptor.
-->
<!ELEMENT module (ejb-jar | application-client | web-app)>
<!ELEMENT ejb-jar (uri, display-name?, description?, rdb-db-pool?,
    (session | entity)+)>
<!ELEMENT web-app (uri, display-name?, description?, context-param*,
    resource-ref*, env-entry*)>
<!ELEMENT application-client (uri, display-name, description?,
resource-ref*, env-entry*)>
<!--
The uri element specifies which module the deployment parameters refer to.
-->
<!ELEMENT uri (#PCDATA)>

<!--
The rdb-db-pool element specifies the name of the database pool that all CMP entity beans in the specified EJB-JAR module have to use on a particular J2EE engine. The value of this element may be overridden by further rdb-db-pool elements that are given in the same module, but defined for CMP entity beans individually.

The creator of a concrete SDA deployment descriptor has to make sure that a database pool with the specified name actually exists in any operational environment the SDA may be deployed to. In particular, SDM does not create any database pools at deployment time in an operational environment.

In case the name of a database pool is defined neither for the EJB-JAR module as a whole nor for an individual CMP entity EJB, the deployer will be prompted to enter the name of a database pool at deployment time. All CMP entity EJBs without assigned database pool will use this database pool then.
-->

```
<!ELEMENT rdb-db-pool (#PCDATA)>

<!--
The elements session and entity group the deployment parameters of
session and entity EJBs within an EJB-JAR module.
-->
<!ELEMENT session (ejb-name, display-name?, description?, env-entry*,
    resource-ref*)>
<!ELEMENT entity (ejb-name, display-name?, description?, env-entry*,
    resource-ref*, storage?)>

<!--
The ejb-name element specifies an enterprise bean's name.
-->
<!ELEMENT ejb-name (#PCDATA)>

<!--
See the DTDs of the standard J2EE deployment descriptors for more
information on the elements resource-ref, env-entry, context-param and
their subelements.
-->
<!ELEMENT resource-ref (description?, res-ref-name, res-type, res-
auth)>
<!ELEMENT res-ref-name (#PCDATA)>
<!ELEMENT res-type (#PCDATA)>
<!--
The possible values of the res-auth element are not unique among the
standard J2EE deployment descriptors. In an SDA deployment descriptor,
this element may have exactly one of the values application and
container.
-->
<!ELEMENT res-auth (#PCDATA)>
<!ELEMENT env-entry (description?, env-entry-name, env-entry-type,
    env-entry-value?)>
<!ELEMENT env-entry-name (#PCDATA)>
<!ELEMENT env-entry-type (#PCDATA)>
<!ELEMENT env-entry-value (#PCDATA)>
<!ELEMENT context-param (param-name, param-value, description?)>
```

```
<!ELEMENT param-name (#PCDATA)>
<!ELEMENT param-value (#PCDATA)>

<!--
The storage element and its subelements contain the storage properties
of a container managed entity bean. The storage element itself simply
distinguishes between possible forms of persistency.
-->
<!ELEMENT storage (rdb-storage)>

<!--
The rdb-storage element and its subelements represent the mapping of
the persistent attributes of a container managed entity bean to the
physical structure of an RDBMS. Note that for some engines, only one
field may be a primary key field.

If the rdb-db-pool element is given here, its value overrides the
corresponding module-global value.
-->
<!ELEMENT rdb-storage (rdb-table, rdb-field-column-map+,
     rdb-finder-descriptor*, rdb-join*, rdb-db-pool?)>
<!ELEMENT rdb-table (#PCDATA)>
<!ELEMENT rdb-field-column-map EMPTY>
<!ATTLIST rdb-field-column-map
     field CDATA #REQUIRED
     table CDATA #REQUIRED
     column CDATA #REQUIRED
     key (prim | foreign | none) #REQUIRED
>
<!ELEMENT rdb-finder-descriptor (rdb-method-argument*)>
<!ATTLIST rdb-finder-descriptor
     method-name CDATA #REQUIRED
     criteria CDATA #REQUIRED
>
<!ELEMENT rdb-method-argument (#PCDATA)>
<!ELEMENT rdb-join EMPTY>
<!ATTLIST rdb-join
     table1 CDATA #REQUIRED
```

```
    table2 CDATA #REQUIRED
    column1 CDATA #REQUIRED
    column2 CDATA #REQUIRED
>

<!--
End of J2EE part
-->

<!--
Begin of FS part
-->
<!--
The fs-deployment-descriptor element introduces the FS specific part of
an SDA deployment descriptor. It contains one or more fileset-elements
which represent a set of files. The set of files defined by a fileset
will be deployed (i.e., copied) to a single root directory which is
defined initially by the default-deployment-dir element.

If all files contained in a SDA should be deployed to a common root
directory the definition of one fileset (without any file-elements)
within the fs-deployment-descriptor would be sufficient.
-->
<!ELEMENT fs-deployment-descriptor (display-name, fileset+)>
<!--
The version attribute enables the parser/interpreter of an SDA
deployment descriptor to distinguish between different versions of this
DTD.
-->
<!ATTLIST fs-deployment-descriptor
    version CDATA #FIXED "1.0"
>
<!--
The ELEMENT display-name is defined in the J2EE-section above
-->
<!--
The ELEMENT description is defined in the J2EE-section above
-->
```

```
<!-- the fileset element describes the set of files that should be
deployed to one common root directory (defined by the default-
deployment-dir).
A fileset can contain file elements. In this case the set of files of
this fileset is exactly the set which is described by the union of the
single files.
If the fileset does not contain single file elements the set of files
defined by this fileset is the complement (according to all files in
the SDA) of the union of the sets of all other filesets (in this fs-
deployment- descriptor) containing single file entries.
Deployment to two (or more) different locations for a set of files is
possible: just define two somewhat equal filesets with different
default-deployment-dir elements.
The fileset has a required attribute named id. This attribute is needed
to guarantee the functionality of a later update of the SDA. The value
of the id-attribute has to be unique within the deployment descriptor.
-->
<!ELEMENT fileset (display-name, description?, file*, default-
deployment-dir)>
<!ATTLIST fileset
        id CDATA #REQUIRED
    createTechnicalID (true | false) #IMPLIED
>

<!--
This element describes a single file which is part of the SDA and
should be deployed to the root directory defined by the deployment-dir
element within this fileset.
-->
<!ELEMENT file (#PCDATA)>

<!--
This element describes the directory where the files of this fileset
should be deployed as proposed by the developer of the SDA deployment
descriptor. Only when the attribute use-default is set to true the
directory will be used for deployment. Otherwise the directory
described by the deployment-dir-element will be used.
-->
```

```
<!ELEMENT default-deployment-dir (#PCDATA)>
<!ATTLIST default-deployment-dir
    use-default (true | false) #IMPLIED
>

<!--
End of FS part
-->
```

Aspects of the invention can be implemented in digital electronic circuitry, or in computer hardware, firmware, software, or in combinations of them. Apparatus of the invention can be implemented in a computer program product tangibly embodied in a machine-readable storage device or data carrier for execution by a programmable processor; and method steps of the invention can be performed by a programmable processor executing a program of instructions to perform functions of the invention by operating on input data and generating output.

The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory.

The essential elements of a computer are a processor for executing instructions and a memory. Generally, a computer will include one or more mass storage devices for storing data files; such devices include magnetic disks, such as internal hard disks and removable disks; magneto-optical disks; and optical disks. Carriers suitable for tangibly embodying computer program instructions and data include all forms of carrier signals, including by way of example electromagnetic signals, electrical signals, and digital data signals transmitted in a digital communication network, and all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing kinds of memory can be supplemented by, or incorporated in, ASICs (application-specific integrated circuits).

To provide for interaction with a user, the invention can be implemented on a computer system having a display device such as a CRT or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, steps of the invention can be performed in a different order and still achieve desirable results.

What is claimed is:

1. A machine-readable storage device encoded with a computer program product implementing a software delivery manager (SDM) for deploying software to a computer system, the SDM being executed by the computer system to:
   receive a software delivery archive (SDA) containing at least one component of software to be deployed on the computer system, a standard manifest describing the at least one component of software, a supplementary manifest including a SDM compatibility version to ensure that the SDA is only handled by a compatible SDM, and a deployment descriptor that includes one or more development parameters, which identify a database pool that entity beans are to use on a deployment engine, or which specify persistence characteristics of container-managed entity beans, the SDA further containing a nested SDA;
   receive input specifying a deployment configuration that is selectable from a plurality of deployment proposals generated by the SDM;
   select the deployment engine based on a software type of the SDA, and a target computer type from the SDA;
   perform the deployment of the at least one component of software in the SDA to the computer system according to the software type and the deployment parameters, and based on the deployment configuration and the deployment engine; and
   maintain a repository containing a list of SDAs and products installed on the computer system, the repository further containing a fingerprint of every file used in applications running on the computer system at the time of the deployment.

2. The machine-readable storage device of claim 1, further comprising instructions to:
   determine a target server type for the deployment; and
   select the deployment engine to perform the deployment according to the target server type.

3. The machine-readable storage device of claim 1 or 2, further comprising instructions to:
   receive a software delivery archive having a manifest indicating a software type of database content;
   deploy the database content to a database on the computer system;
   receive a software delivery archive having a manifest indicating a software type of J2EE application; and
   deploy the J2EE application to a J2EE server on the computer system.

4. The machine-readable storage device of claim 1 or 2, further comprising instructions to:
   receive a software delivery archive having a manifest indicating a software type of file system content;
   deploy the file system content including a file to a file system on the computer system;
   receive a software delivery archive having a manifest indicating a software type of J2EE application; and
   deploy the J2EE application to a J2EE server on the computer system.

5. The machine-readable storage device of claim 1 or 2, wherein the manifest comprises a standard JAR manifest and the supplementary manifest includes the software type.

6. The machine-readable storage device of claim 1 or 2, wherein the software delivery archive contains one or more deployment environment dependencies, the product further comprising instructions to:
   maintain in the repository information about one or more logical target systems in a deployment environment; and
   find a logical target system in the deployment environment that satisfies the one or more deployment environment dependencies contained in the software delivery archive.

7. The machine-readable storage device of claim 1, further comprising instructions to:
   receive an updated software delivery archive, the updated software delivery archive being an update of a previously deployed software delivery archive; and
   reuse deployment parameters of the previously deployed software delivery archive in deploying the updated software delivery archive.

8. A method implementing a software delivery manager (SDM) executing on a computer system for deploying software onto the computer system, comprising:

receiving in a computer system a software delivery archive (SDA) containing at least one component of software to be deployed on the computer system, a standard Java archive (JAR) manifest describing the at least one component of software, a supplementary manifest including a SDM compatibility version to ensure that the SDA is only handled by a compatible SDM, and a deployment descriptor that includes one or more development parameters, which identify a database pool that entity beans are to use on a deployment engine, or which specify persistence characteristics of container-managed entity beans, the SDA further containing a nested SDA;

receiving input specifying a deployment configuration that is selectable from a plurality of deployment proposals generated by the SDM;

selecting the deployment engine based on a software type of the SDA, and a target computer type from the SDA;

performing the deployment of the at least one component of software in the SDA to the computer system according to the software type and the deployment descriptor, and based on the deployment configuration and the deployment engine; and maintaining a repository containing a list of SDAs and products installed on the computer system, the repository further containing a fingerprint of every file used in applications running on the computer system at the time of the deployment.

9. The method of claim 8, further comprising:

determining a target server type for the deployment; and selecting the deployment engine to perform the deployment according to the target server type.

10. The method of claim 8 or 9, further comprising:

receiving a software delivery archive having a manifest indicating a software type of database content; and deploying the database content to a database on the computer system.

11. The method of claim 8 or 9, further comprising:

receiving a software delivery archive having a manifest indicating a software type of J2EE application; and deploying the J2EE application to a J2EE server on the computer system.

12. The method of claim 8 or 9, further comprising:

receiving a software delivery archive having a manifest indicating a software type of file system content; and deploying the file system content including a file to a file system on the computer system.

13. The method of claim 8 or 9, wherein the manifest comprises a standard JAR manifest and the supplementary manifest includes the software type.

14. The method of claim 8 or 9, wherein the software delivery archive contains one or more deployment environment dependencies, the method further comprising:

maintain in the repository information about one or more logical target systems in a deployment environment; and find a logical target system in the deployment environment that satisfies the one or more deployment environment dependencies contained in the software delivery archive.

15. The method of claim 8, further comprising:

receiving an updated software delivery archive, the updated software delivery archive being an update of a previously deployed software delivery archive; and reusing deployment parameters of the previously deployed software delivery archive in deploying the updated software delivery archive.

\* \* \* \* \*